United States Patent
Farooq

(10) Patent No.: US 12,321,780 B2
(45) Date of Patent: Jun. 3, 2025

(54) SYSTEM AND METHOD FOR EXECUTING DATA PROCESSING TASKS

(71) Applicant: The Toronto-Dominion Bank, Toronto (CA)

(72) Inventor: Zeeshan Farooq, Milton (CA)

(73) Assignee: The Toronto-Dominion Bank, Toronto (CA)

( * ) Notice: Subject to any disclaimer, the term of this patent is extended or adjusted under 35 U.S.C. 154(b) by 518 days.

(21) Appl. No.: 17/890,698

(22) Filed: Aug. 18, 2022

(65) Prior Publication Data

US 2024/0061705 A1  Feb. 22, 2024

(51) Int. Cl.
  *G06F 9/48* (2006.01)
  *G06F 8/30* (2018.01)

(52) U.S. Cl.
  CPC ............ *G06F 9/4881* (2013.01); *G06F 8/311* (2013.01)

(58) Field of Classification Search
  None
  See application file for complete search history.

(56) References Cited

U.S. PATENT DOCUMENTS

| | | | | |
|---|---|---|---|---|
| 8,161,483 B2 * | 4/2012 | Barsness | ............... | G06F 9/4405 718/102 |
| 8,185,901 B2 * | 5/2012 | Barsness | ............. | G06F 11/3495 718/102 |
| 8,448,172 B2 * | 5/2013 | Tamiya | ................. | G06F 9/4881 703/22 |
| 9,256,471 B2 * | 2/2016 | Kim | ....................... | G06F 9/4887 |
| 9,430,285 B2 * | 8/2016 | Nishimura | ............ | G06F 9/4881 |
| 9,830,157 B2 * | 11/2017 | Gupta | ..................... | G06F 8/314 |
| 10,585,845 B2 | 3/2020 | Chen et al. | | |
| 11,121,725 B2 * | 9/2021 | Murali | ................... | G06N 10/20 |
| 11,163,606 B1 | 11/2021 | Hampton | | |
| 11,327,932 B2 | 5/2022 | Hung et al. | | |
| 2022/0129305 A1 | 4/2022 | Tenner et al. | | |

FOREIGN PATENT DOCUMENTS

| | | | |
|---|---|---|---|
| CN | 111198689 A | 5/2020 | |
| CN | 112463331 A | 3/2021 | |
| CN | 114416364 A | 4/2022 | |

* cited by examiner

*Primary Examiner* — Van H Nguyen
(74) *Attorney, Agent, or Firm* — BORDEN LADNER GERVAIS LLP (OTTAWA); Curtis Behmann

(57) ABSTRACT

Computing platforms, methods, and storage media for executing data processing tasks are disclosed. Exemplary implementations may: receive a plurality of serially executable software object tasks; obtain thread data associated with a plurality of available threads and machine data associated with a plurality of available machines; distribute the plurality of serially executable software object tasks for parallel execution via the plurality of available threads and on the plurality of available machines; and obtain and store shared thread data for the plurality of available threads, such that first thread status data associated with a first thread from the plurality of available threads is made available to a second thread from the plurality of available threads. Executing software tasks in parallel, even when the tasks were not designed to be executed in parallel, increases speed and execution of the software tasks, which uses less processing power and less memory compared to known approaches.

13 Claims, 6 Drawing Sheets

| ○ ㅂ SharedThreadData | |
|---|---|
| ○ ㅂ mWorkbook LinkedHashMap<String, LinkedList<LinkedHashMap<String, Object>>> | |
| ○ ㅂ LastThreadRan | ReportPortal |
| ○ ㅂ TotalThreads | ReportPortal |
| ○ ㅂ StartTimeStamp | ReportPortal |
| ○ ㅂ success | ReportPortal |
| ○ ㅂ SharedThreadData0 | |
| ○ ㅂ FailTest(String) | void |
| ○ ㅂ PassTest(String) | void |
| ○ ㅂ RemoveTestcase(String) | void |
| ○ ㅂ RunTest(String) | void |
| ○ ㅂ addResult(Results) | void |
| ○ ㅂ addTestcase(String) | void |
| ○ ㅂ getCurrentStatus(String) | String |
| ○ ㅂ getFailSize0 | Int |
| ○ ㅂ getFailedCountForTC(String) | Int |
| ○ ㅂ getFailedMap0 | Map+String, Integer |
| ○ ㅂ getFinalResult0 | boolean |
| ○ ㅂ getResults0 | LinkedList<Results> |
| ○ ㅂ getSharedData(String) | String |
| ○ ㅂ getSharedDataSet0 | HashMap<String, String> |
| ○ ㅂ getall0 | Map<String, String> |
| ○ ㅂ isFailed(String) | boolean |
| ○ ㅂ isRunning(String) | boolean |
| ○ ㅂ jtmfUpdate(boolean) | void |

FIG.4A

SYSTEM AND METHOD FOR EXECUTING DATA PROCESSING TASKS

FIELD

The present disclosure relates to data transfers, including but not limited to computing platforms, methods, and storage media for executing data processing tasks.

BACKGROUND

A software project or software program may include a number of different tasks, such as data processing tasks or software object tasks. Some software projects include many interdependent tasks that are set to execute sequentially on a single host. Such sequential execution takes time. It is also time consuming to enable threading and control across the infrastructure on which the software is to be executed.

In some software implementations, it is often desirable or necessary to have parallel threading or execution. However, in most cases the programs themselves must be written to support parallel execution, and the parallel execution often stays on same machine/container. Improvements in approaches for executing data processing tasks are desirable.

BRIEF DESCRIPTION OF THE DRAWINGS

Embodiments of the present disclosure will now be described, by way of example only, with reference to the attached Figures.

FIG. 4A, FIG. 4B and FIG. 4C illustrate a data structure and data variables associated with a system for executing data processing tasks, in accordance with one or more embodiments.

DETAILED DESCRIPTION

Figure 1:
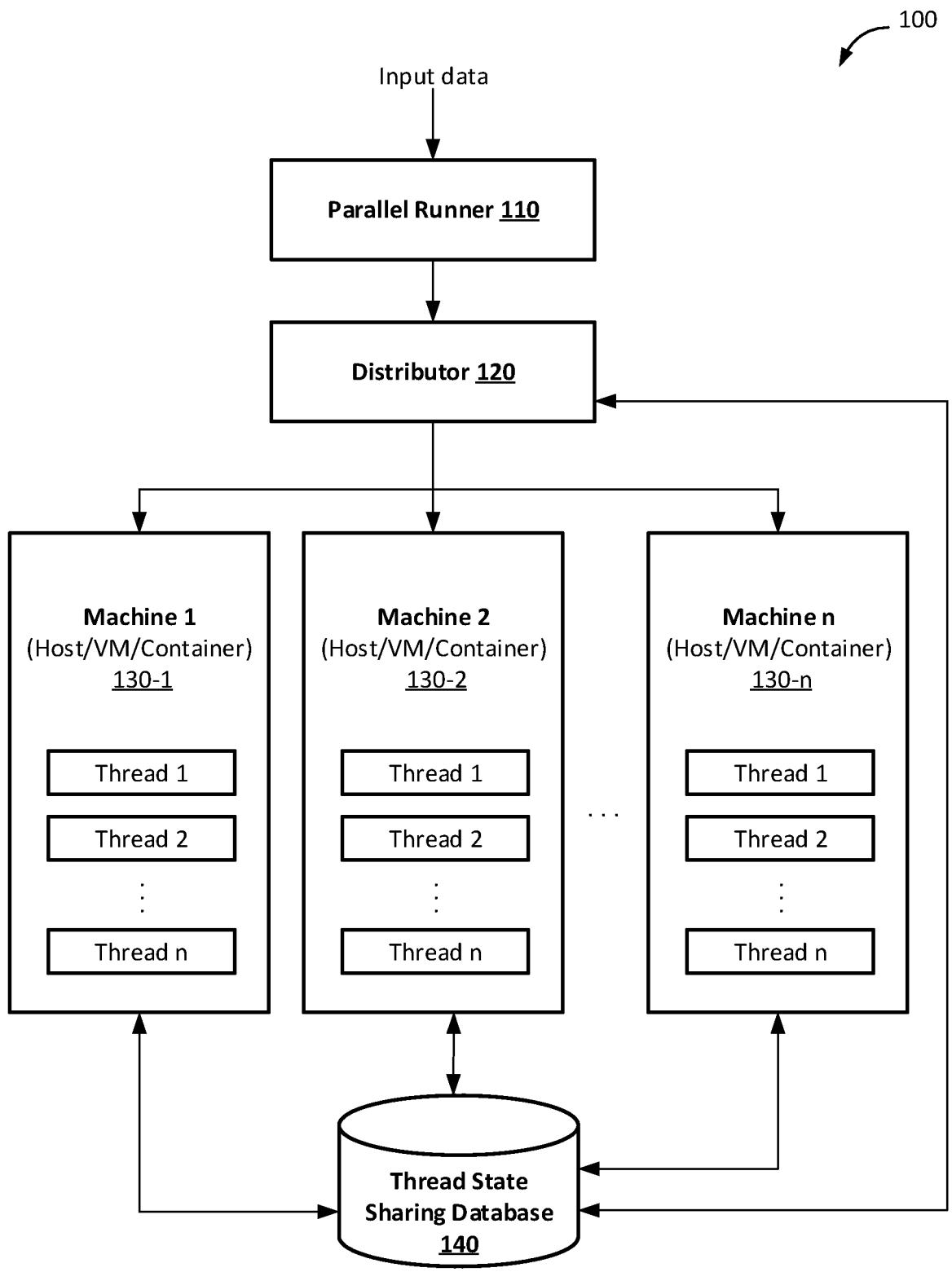
FIG. 1 illustrates a block and flow diagram of a system configured for executing data processing tasks, in accordance with one or more embodiments.

Computing platforms, methods, and storage media for executing data processing tasks are disclosed. Exemplary implementations may: receive a plurality of serially executable software object tasks; obtain thread data associated with a plurality of available threads and machine data associated with a plurality of available machines; distribute the plurality of serially executable software object tasks for parallel execution via the plurality of available threads and on the plurality of available machines; and obtain and store shared thread data for the plurality of available threads, such that first thread status data associated with a first thread from the plurality of available threads is made available to a second thread from the plurality of available threads. Executing software tasks in parallel, even when the tasks were not designed to be executed in parallel, increases speed and execution of the software tasks, which uses less processing power and less memory compared to known approaches.

Embodiments of the present disclosure provide a system and method configured to enable parallel execution of software tasks that have been designed to be run serially, without modifying the underlying code.

A separate object may be provided on a server, which enables tasks in a software object to be distributed to a number of different threads for parallel execution in a number of machines, such as hosts, virtual machines or containers. In accordance with one or more embodiments, a computing device associated with a user may run any objects across multiple threads, and/or across infrastructure to speed up task's executions.

One aspect of the present disclosure relates to a computing platform configured for executing data processing tasks. The computing platform may include a non-transient computer-readable storage medium having executable instructions embodied thereon. The computing platform may include one or more hardware processors configured to execute the instructions. The processor(s) may execute the instructions to receive a plurality of serially executable software object tasks. The processor(s) may execute the instructions to obtain thread data associated with a plurality of available threads and machine data associated with a plurality of available machines. The processor(s) may execute the instructions to distribute the plurality of serially executable software object tasks for parallel execution via the plurality of available threads and on the plurality of available machines. The processor(s) may execute the instructions to obtain and store shared thread data for the plurality of available threads such that first thread status data associated with a first thread from the plurality of available threads is made available to a second thread from the plurality of available threads.

Another aspect of the present disclosure relates to a method for executing data processing tasks. The method may include receiving a plurality of serially executable software object tasks. The method may include obtaining thread data associated with a plurality of available threads and machine data associated with a plurality of available machines. The method may include distributing the plurality of serially executable software object tasks for parallel execution via the plurality of available threads and on the plurality of available machines. The method may include obtaining and storing shared thread data for the plurality of available threads such that first thread status data associated with a first thread from the plurality of available threads is made available to a second thread from the plurality of available threads.

Yet another aspect of the present disclosure relates to a non-transient computer-readable storage medium having instructions embodied thereon, the instructions being executable by one or more processors to perform a method for executing data processing tasks. The method may include receiving a plurality of serially executable software object tasks. The method may include obtaining thread data associated with a plurality of available threads and machine data associated with a plurality of available machines. The method may include distributing the plurality of serially executable software object tasks for parallel execution via the plurality of available threads and on the plurality of available machines. The method may include obtaining and storing shared thread data for the plurality of available threads such that first thread status data associated with a first thread from the plurality of available threads is made available to a second thread from the plurality of available threads.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

FIG. 1 illustrates a block and flow diagram of a system 100 configured for executing data processing tasks, in accordance with one or more embodiments. At an entry point, input data may be provided to configure the system 100. In an example implementation, the input data may be received from a computing device, such as a user device. The input data may comprise serially executable software tasks, and configuration information including thread data and/or machine data. The configuration information may include: thread configuration data, how many threads to run, where the threads are to be run, whether a thread or series of threads will automatically be executed, thread dependencies, an entry point for a target class, and what state data will be shared with other threads.

In an implementation, a parallel runner 110 is configured to receive a plurality of serially executable software object tasks. The serially executable software object tasks may comprise tasks associated with execution of a software object, which were designed to be executed in series, or serially. The parallel runner 110 is also configured to obtain thread data associated with a plurality of available threads, and machine data associated with a plurality of available machines.

The thread data may comprise data including a number of available threads, a processing capacity associated with the available thread(s), or other data associated with a thread enabled to execute a software object task. The thread data may be based on generic data associated with system properties, or may be customized data determined based on system properties and in relation to availability to execute the plurality of serially executable software tasks that have been received.

The machine data may comprise data including a number of available machines, whether the machines comprise a host, a virtual machine (VM), or a container. The machine data may comprise a processing capacity, processing speed or memory associated with the available machine(s), or other data associated with a machine enabled to execute a software object task. The thread data may be based on generic data associated with system properties, or may be customized data determined based on system properties and in relation to availability to execute the plurality of serially executable software tasks that have been received.

A distributor 120 is in communication with the parallel runner 110 and is configured to distribute the plurality of serially executable software object tasks for parallel execution via the plurality of available threads 1, n that are available on the plurality of available machines 130-1, 130-2, . . . , 130-n.

A database or data store, such as thread state sharing database 140, is in communication with the distributor 120, and optionally with one or more of the plurality of available machines, and configured to obtain and store shared thread data for the plurality of available threads. The data is stored such that first thread status data associated with a first thread from the plurality of available threads is made available to a second thread from the plurality of available threads. In an example embodiment, thread data for a first thread is made available to a second thread, where the second thread may have a dependency on the first thread, and may employ the thread data as part of scheduling execution.

The thread status data may comprise a thread state, for example an indication of whether or not a thread has fully completed execution, an indication of a degree of completion of the thread (e.g. a percentage, a fraction), and/or whether the current thread is dependent on one or more other threads in order for execution of the current thread to be completed. The thread status data may optionally include details on thread dependency, for example details on the number of other tasks or threads on which the current task or thread is dependent for completion of either a portion of the task or thread, or to reach full completion of the task or thread. The thread state sharing database may comprise status information relating to the parallel runner 110, in general or specifically in relation to one or more threads.

In an embodiment, the data is stored such that first thread status data associated with a first thread from the plurality of available threads is made available to a set of other threads from the plurality of available threads. In an embodiment, the data is stored such that a first set of thread status data associated with a first set of threads from the plurality of available threads is made available to a second set of thread status data associated with a second set of threads from the plurality of available threads.

The system 100 may be configured to enable communication between threads to communicate thread state data, for example via data storage. The data storage may be implemented as a thread state sharing database 140, and may be configured to store one or more of: thread state; thread data; and/or runner status. By accessing the information in the thread state sharing database 140, each thread may be aware of and informed of the status of other threads, for example what other threads are doing.

Once an initial configuration is completed, the system 100 may be configured to execute a plurality of serially executable software tasks (e.g. associated with a program) and to distribute the tasks, and start running the tasks one by one. As indicated above, the thread state sharing database 140 may be configured to store thread information and data and runner status. The distributor 120 distributes the tasks, and one or more of the machines 130-1, 130-2, . . . , 130-n runs the threads assigned to it. In an example implementation, the machines 130-1, 130-2, . . . , 130-n may be a host, a virtual machine (VM), or a container, and the set of machines may include machines of different types.

In known approaches, a program is typically built or written without worrying about whether it will run in parallel. Embodiments of the present disclosure speed up the tasks to run a number of tasks in parallel, for example running 15 tasks in parallel.

Embodiments of the present disclosure provide a technical advantage that improves the operation of a system for executing data processing tasks, by executing software tasks in parallel, even when the tasks were not designed to be executed in parallel. This provides a technical advantage of increasing speed and execution of the software tasks, which uses less processing power and less memory compared to known approaches. Embodiments of the present disclosure provide this technical advantage of improved processing speed and/or reduced resource use, without modifying the underlying software code. Instead of re-building or re-writing code for a program that was originally designed to run software object tasks serially, embodiments of the present disclosure provide an approach, such as an engine, that is configured to run software object tasks associated with the program in parallel, without having to modify the underlying code.

In an implementation, the parallel runner 110, the distributor 120 and the thread state sharing database 140 are provided as part of a server library, such as a Java library on a server associated with an organization, such as a financial institution. In an example implementation, the parallel runner 110, the distributor 120 and the thread state sharing database 140 are provided on, or as part of, a repository hosting software code for the organization.

The parallel runner 110 may be provided on any computing device that can run a Java program, and may be in communication with the machines 130-1, 130-2, . . . , 130-*n* that are available for parallel processing. Alternatively, the parallel runner 110 may be provided in any other programming language or construct, and provided on or in communication with a processor or computing device.

In an implementation, a minimum set of information required for operation of the system 100 comprises: reference to thread dependencies; a list of available machines (containers/VMs/hosts); and configuration data.

In an implementation, the parallel runner 110 is configured to initiate a software task or object and ensure that the task running, and optionally control each thread's starting point. In an implementation, the parallel runner 110 is configured to start a plurality of serially executable software tasks, wherein each task is executed by one of the plurality of machines.

For any data that is running, the thread state sharing database 140 and associated data, which may include share data, may be configured to enable a thread to share its state with another thread. This enables the system 100 to run tasks which matter to both threads. For example, for a given set of tasks, the system 100 is configured to enable each thread involved to know that the other threads are running the other portions of the tasks.

For example, suppose a user is adding an account for a customer, but the same account needs to be visible to thread 10. Thread 1 will share that data into a thread sharing database 140, and thread 10 can go to the database 140 and look for the data, and use the data as part of its process. The thread sharing database 140 may be considered a shared data pool. In an implementation, any data or state information that is shareable between threads is done via this procedure.

In another example, consider a scenario in which the system 100 obtains thread dependency information indicating that threads 2, 13, 24 and 37 are dependent on each other. In such a case, the system may be configured to enable each of these threads to share thread data with each other. The system may also be configured to run these dependent tasks in a similar time period, or run the tasks together in a prioritized manner.

In an implementation, the share data stays in memory and is not persistently stored; in another implementation, the share data is persistently stored in memory. In an implementation, actual thread information will be in memory when another thread is running. When a given task, or set of tasks, is completed and executed, the system 100 may be configured to discard the associated information from memory, or store/dump the information.

In an implementation, the shared data may be stored on the same machine where the parallel runner 110 is running; in another implementation, the share data may be stored on a different machine. In an implementation, the parallel runner 110 and distributor 120 are provided on the same machine; in another implementation, the parallel runner 110 and distributor 120 are provided on separate machines.

In an example implementation, an initial configuration is performed before running a plurality of software tasks, and during run time the configuration is not modified. In an implementation, the configuration data may be modified in order to change the parameters for execution.

In another implementation, the system 100 may be configured to dynamically modify a number of available threads associated with executing the plurality of serially executable software object tasks based on detected workload or available resources. In an example embodiment, the system 100 may be configured to dynamically increase thread count, or a number of available threads associated with executing the plurality of serially executable software object tasks, based on detected workload or available resources, for example based on increased workload and/or decreased available resources. In an example embodiment, the system 100 may be configured to dynamically decrease thread count, or a number of available threads associated with executing the plurality of serially executable software object tasks, based on detected workload or available resources, for example based on decreased workload and/or increased available resources.

For example, at a first time t1, the system 100 may determine a first number of threads associated with executing the set of serially executable software tasks. This first determination may be based on a first workload measurement and a first number of available resources with respect to t1. At a second time t2, the system 100 may dynamically increase the thread count required to execute the set of serially executable software tasks, based on a second workload measurement and a second number of available resources. For example, at t2, the workload may have increased and the number of available resources may have decreased compared to t1, in response to which the system 100 may dynamically increase the thread count associated with executing the set of serially executable software tasks in parallel.

Figure 2:
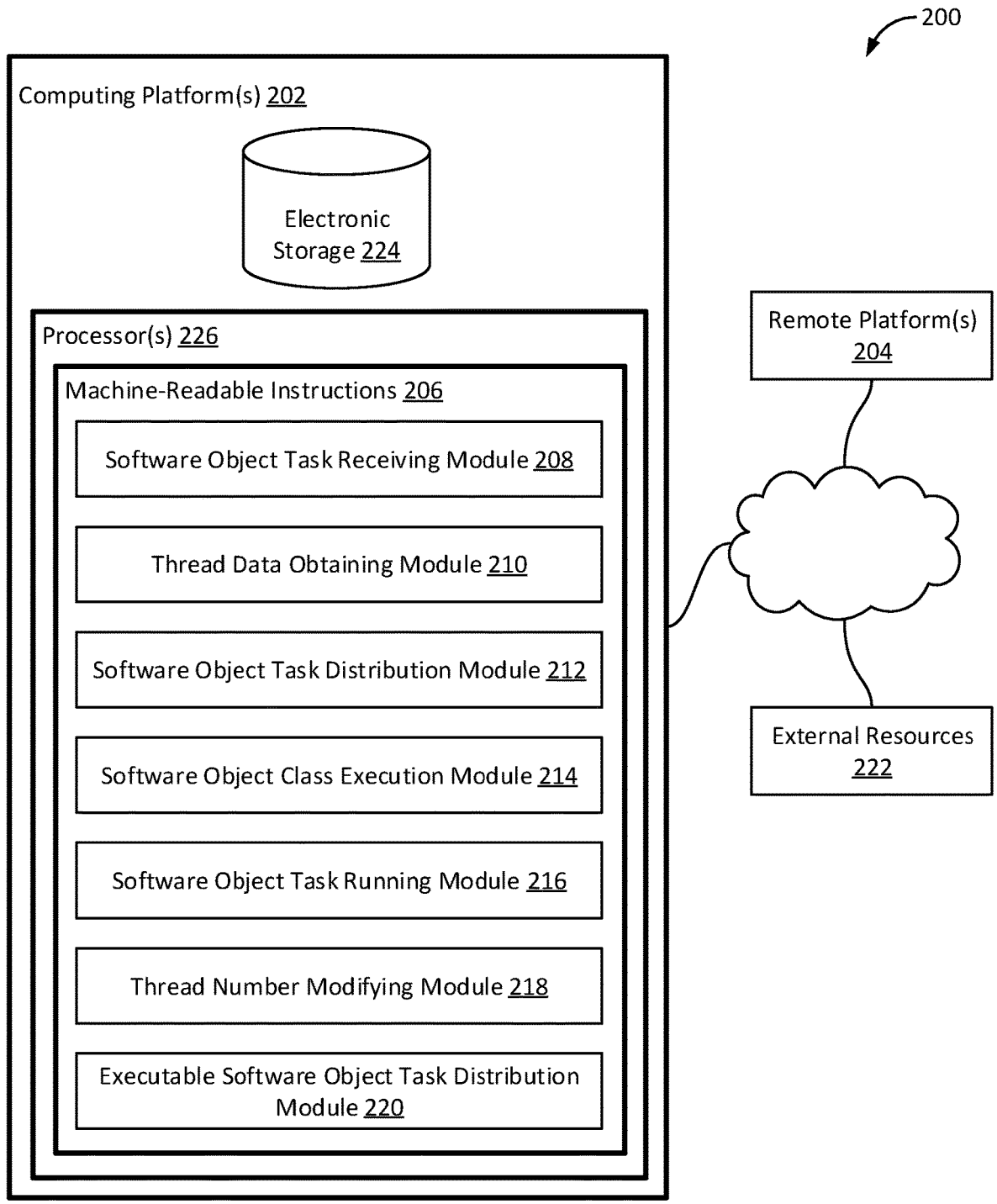
FIG. 2 illustrates a system configured for executing data processing tasks, in accordance with one or more embodiments.

FIG. 2 illustrates a system 200 configured for executing data processing tasks, in accordance with one or more embodiments. In some embodiments, system 200 may include one or more computing platforms 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules. The instruction modules may include computer program modules. The instruction modules may include one or more of software object task receiving module 208, thread data obtaining module 210, software object task distribution module 212, software object class execution module 214, software object task running module 216, thread number modifying module 218, executable software object task distribution module 220, and/or other instruction modules.

Software object task receiving module 208 may be configured to receive a plurality of serially executable software object tasks.

Thread data obtaining module 210 may be configured to obtain thread data associated with a plurality of available threads and machine data associated with a plurality of available machines. By way of non-limiting example, the plurality of available machines may be selected from the group consisting of hosts, virtual machines and containers.

Thread data obtaining module 210 may be configured to obtain and store shared thread data for the plurality of available threads, such that first thread status data associated with a first thread from the plurality of available threads is made available to a second thread from the plurality of available threads. Distributing the plurality of serially executable software objects and storing the shared thread data may be performed by the same machine.

Software object task distribution module 212 may be configured to distribute the plurality of serially executable software object tasks for parallel execution via the plurality of available threads and on the plurality of available machines.

The plurality of serially executable software tasks may comprise a plurality of classes associated with an original software object. Software object class execution module 214 may be configured to execute, using a parallel runner object separate from the original software object, at least two of the plurality of classes in parallel, when the original software object was written to be executed serially.

Software object task running module 216 may be configured to run the plurality of serially executable software object tasks in parallel such that the underlying software code is unmodified.

Thread number modifying module 218 may be configured to dynamically modify, for example increase or decrease, a number of available threads based on detected workload. Thread number modifying module 218 may be configured to dynamically modify, for example increase or decrease, a number of available threads based on available resources.

Executable software object task distribution module 220 may be configured to distribute the plurality of serially executable software object tasks for parallel execution on a plurality of separate machines or processing units with separate resources. Executable software object task distribution module 220 may be configured to distribute the plurality of serially executable software object tasks for parallel execution based on system configuration data. By way of non-limiting example, the system configuration data may include one or more of thread dependencies, a list of available machines, and configuration data.

In some implementations, one or more of the modules may be integrated within an existing project, or run standalone on a shell. In some implementations, the tasks may be distributed for parallel execution to a plurality of different types of available machines.

In some embodiments, computing platform(s) 202, remote platform(s) 204, and/or external resources 222 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 222 may be operatively linked via some other communication media.

A given remote platform 204 may include one or more processors configured to execute computer program modules. The computer program modules may be configured to enable an expert or user associated with the given remote platform 204 to interface with system 200 and/or external resources 222, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 222 may include sources of information outside of system 200, external entities participating with system 200, and/or other resources. In some embodiments, some or all of the functionality attributed herein to external resources 222 may be provided by resources included in system 200.

Computing platform(s) 202 may include electronic storage 224, one or more processors 226, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 224 may comprise non-transitory storage media that electronically stores information. The electronic storage media of electronic storage 224 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 224 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 224 may include one or more virtual storage resources (e.g., cloud storage, a virtual private network, and/or other virtual storage resources). Electronic storage 224 may store software algorithms, information determined by processor(s) 226, information received from computing platform(s) 202, information received from remote platform(s) 204, and/or other information that enables computing platform(s) 202 to function as described herein.

Processor(s) 226 may be configured to provide information processing capabilities in computing platform(s) 202. As such, processor(s) 226 may include one or more of a digital processor, an analog processor, a digital circuit designed to process information, an analog circuit designed to process information, a state machine, and/or other mechanisms for electronically processing information. Although processor(s) 226 is shown in FIG. 2 as a single entity, this is for illustrative purposes only. In some embodiments, processor(s) 226 may include a plurality of processing units.

These processing units may be physically located within the same device, or processor(s) 226 may represent processing functionality of a plurality of devices operating in coordination. Processor(s) 226 may be configured to execute modules 208, 210, 212, 214, 216, 218, and/or 220, and/or other modules. Processor(s) 226 may be configured to execute modules 208, 210, 212, 214, 216, 218, and/or 220, and/or other modules by software; hardware; firmware; some combination of software, hardware, and/or firmware; and/or other mechanisms for configuring processing capabilities on processor(s) 226. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214, 216, 218, and/or 220 are illustrated in FIG. 2 as being implemented within a single processing unit, in embodiments in which processor(s) 226 includes multiple processing units, one or more of modules 208, 210, 212, 214, 216, 218, and/or 220 may be implemented remotely from the other modules. The description of the functionality provided by the different modules 208, 210, 212, 214, 216, 218, and/or 220 described below is for illustrative purposes, and is not intended to be limiting, as any of modules 208, 210, 212, 214, 216, 218, and/or 220 may provide more or less functionality than is described. For example, one or more of modules 208, 210, 212, 214, 216, 218, and/or 220 may be eliminated, and some or all of its functionality may be provided by other ones of modules 208, 210, 212, 214, 216, 218, and/or 220. As another example, processor(s) 226 may be configured to execute one or more additional modules that may perform some or all of the functionality attributed below to one of modules 208, 210, 212, 214, 216, 218, and/or 220.

Figure 3:
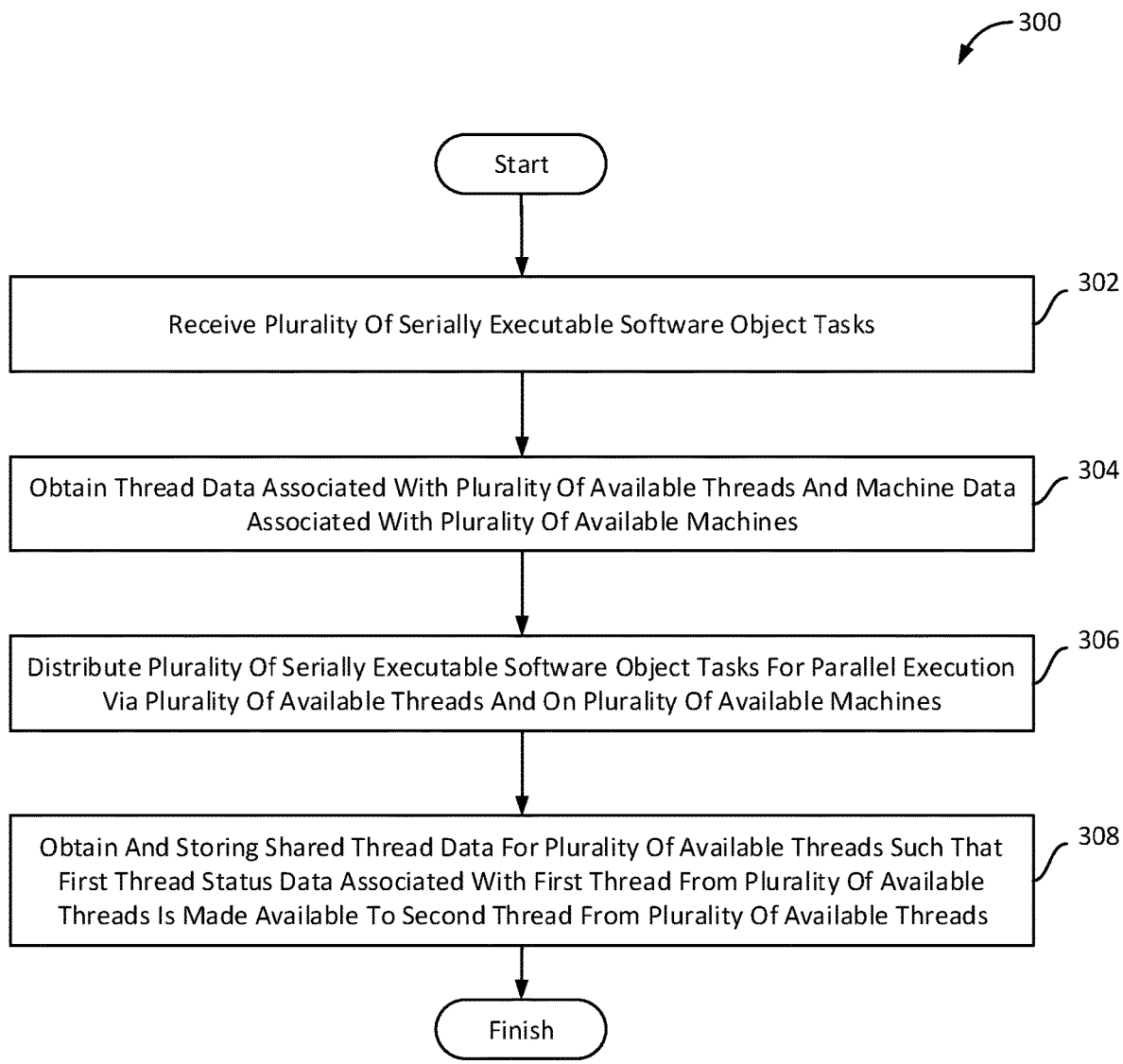
FIG. 3 illustrates a method for executing data processing tasks, in accordance with one or more embodiments.

FIG. 3 illustrates a method 300 for executing data processing tasks, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include receiving a plurality of serially executable software object tasks. Operation 302 may be performed by one or more hardware processors configured by machine-readable instructions including a module that is the same as or similar to software object task receiving module 208, in accordance with one or more embodiments.

An operation 304 may include obtaining thread data associated with a plurality of available threads and machine data associated with a plurality of available machines. Operation 304 may be performed by one or more hardware processors configured by machine-readable instructions including a module that is the same as or similar to thread data obtaining module 210, in accordance with one or more embodiments.

An operation 306 may include distributing the plurality of serially executable software object tasks for parallel execution via the plurality of available threads and on the plurality of available machines. Operation 306 may be performed by one or more hardware processors configured by machine-readable instructions including a module that is the same as or similar to software object task distribution module 212, in accordance with one or more embodiments.

An operation 308 may include obtaining and storing shared thread data for the plurality of available threads such that first thread status data associated with a first thread from the plurality of available threads is made available to a second thread from the plurality of available threads. Operation 308 may be performed by one or more hardware processors configured by machine-readable instructions including a module that is the same as or similar to thread data obtaining module 210, in accordance with one or more embodiments.

Figure 4B:
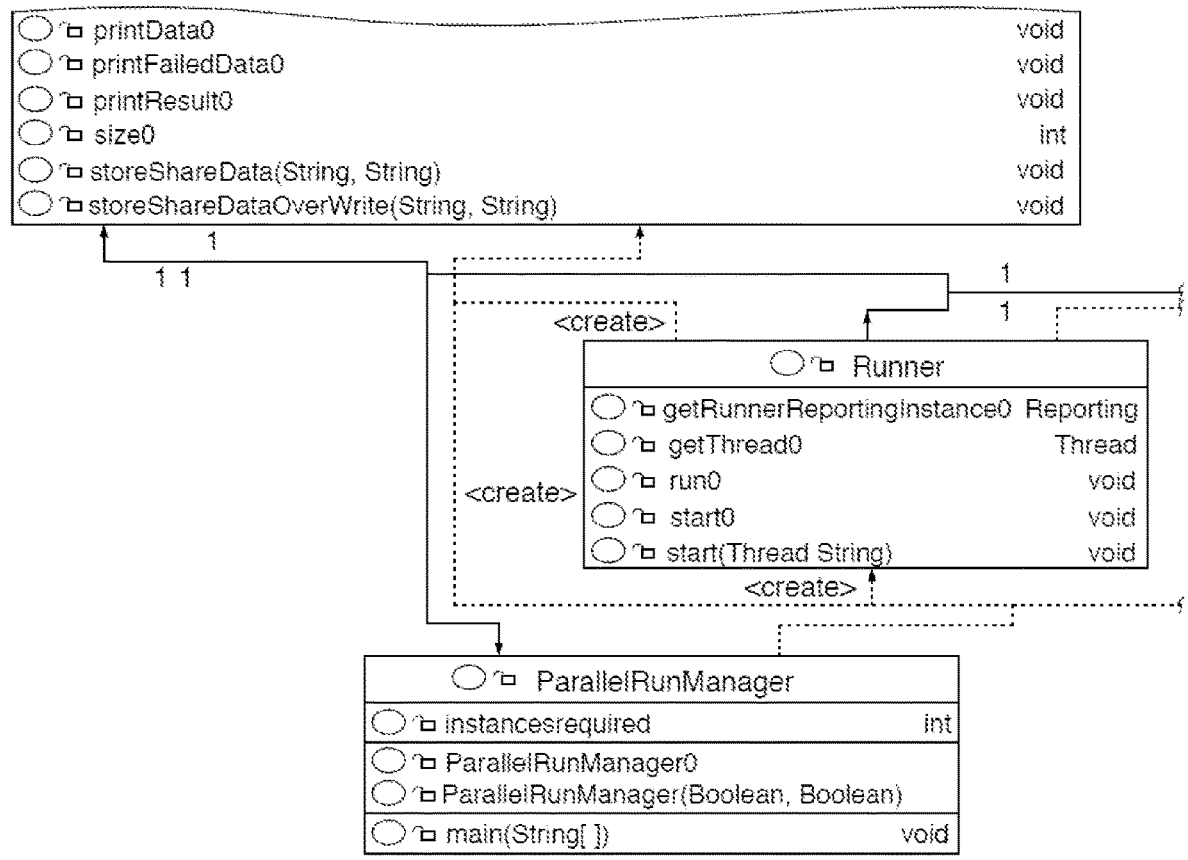
Figure 4C:
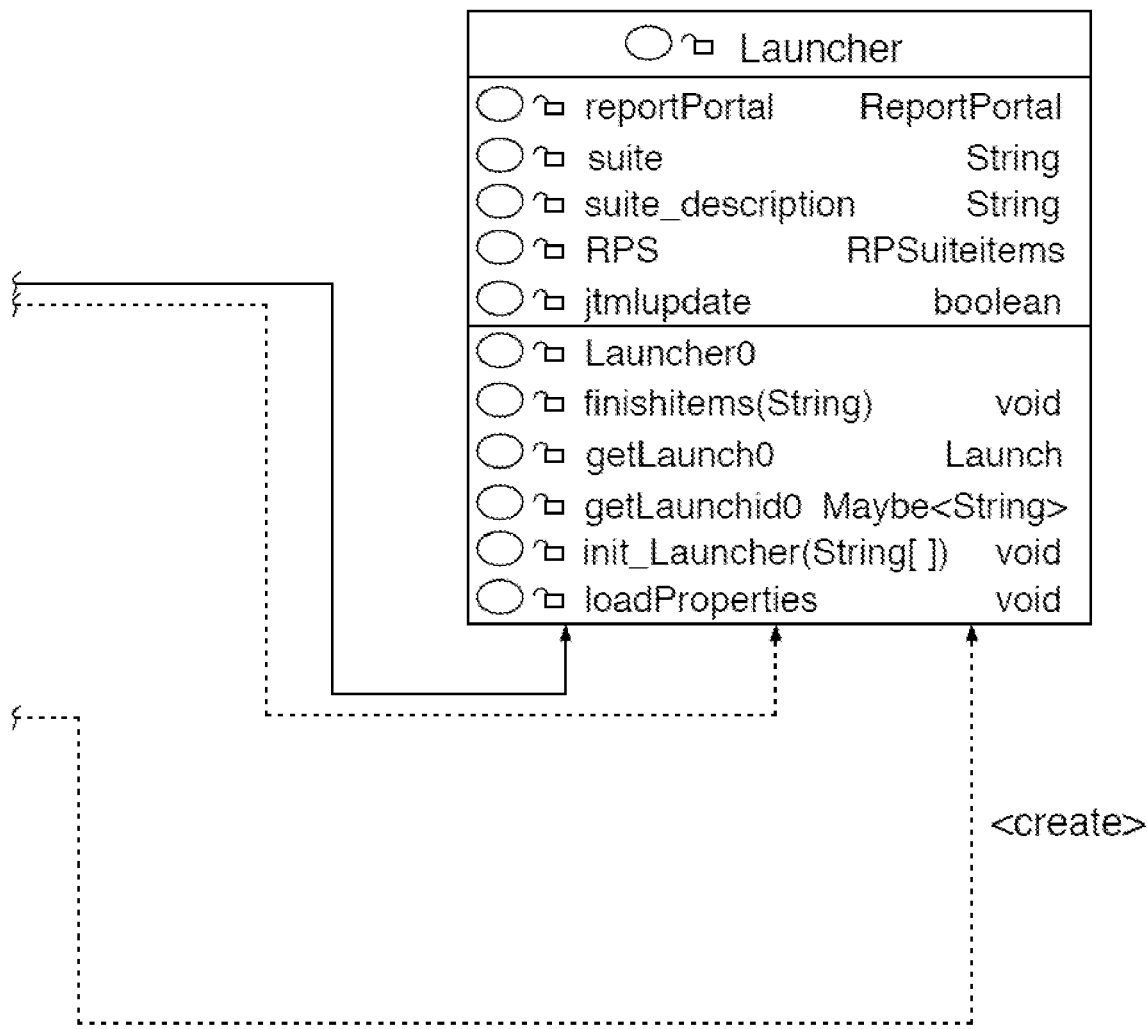

FIG. 4A, FIG. 4B and FIG. 4C illustrate a data structure and data variables associated with a system for executing data processing tasks, in accordance with one or more embodiments. The example data structure shown in FIG. 4A includes a shared thread data variable named SharedThreadData, for example as stored in the thread state sharing database 140 of FIG. 1. As shown in FIG. 4A, the shared thread data may include variables, code or functionality to obtain a last thread run, total number of threads, start time stamp, and an indication of whether the thread was successfully completed. The shared thread data may also include variables, code or functionality to obtain test case data, failed data, final result data, shared data, data on whether a thread is running, failed or completed, and data size information.

The example data structure as shown in FIG. 4B includes runner data named Runner and parallel run manager data named ParallelRunManager, which may be communicated with the shared thread data variable, and may be used by the system 100 and/or the parallel runner 110. The runner data may include a parallel run manager reporting instance, including data on threads and whether they have started or have been run. The parallel run manager data, which is in communication with the runner data, may include an identification of the instances required. The example data structure as shown in FIG. 4C includes launcher data named Launcher, which may be communicated with the shared thread data variable, and may be used by the system 100 and/or the distributor 120, respectively. The launcher data may include report portal data, suite data and suite description, and an indication of whether an item has been launched or properties have been loaded.

In accordance with one or more embodiments, a system and method are configured to enable parallel execution of software tasks that have been designed to be run serially, without modifying the underlying code. For example, a separate object may be provided on a server, which enables tasks in an existing software object to be distributed to a number of different threads for parallel execution in a number of machines, such as hosts, virtual machines or containers. In accordance with one or more embodiments, a user or a computing device may be provided with the capability to run any objects across multiple threads, across infrastructure to speed up task's executions.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be affected to the particular embodiments by those of skill in the art without departing from the scope, which is defined solely by the claims appended hereto.

Embodiments of the disclosure can be described with reference to the following clauses, with specific features laid out in the dependent clauses:

An aspect of the present disclosure relates to an apparatus configured for processing instructions associated with one or more data transfers. The apparatus may comprise a parallel runner configured to receive a plurality of serially executable software object tasks and to obtain thread data associated with a plurality of available threads and to obtain machine data associated with a plurality of available machines. The apparatus may comprise a distributor configured to distribute the plurality of serially executable software object tasks for parallel execution via the plurality of available threads and on the plurality of available machines. The apparatus may comprise a thread state sharing database configured to obtain and store shared thread data for the plurality of available threads such that first thread status data associated with a first thread from the plurality of available threads is made available to a second thread from the plurality of available threads.

One aspect of the present disclosure relates to a system configured for executing data processing tasks. The system may include one or more hardware processors configured by machine-readable instructions. The processor(s) may be configured to receive a plurality of serially executable software object tasks. The processor(s) may be configured to obtain thread data associated with a plurality of available threads and machine data associated with a plurality of available machines. The processor(s) may be configured to distribute the plurality of serially executable software object tasks for parallel execution via the plurality of available threads and on the plurality of available machines. The processor(s) may be configured to obtain and store shared thread data for the plurality of available threads such that first thread status data associated with a first thread from the plurality of available threads is made available to a second thread from the plurality of available threads.

In some implementations of the system, the plurality of serially executable software tasks may include a plurality of classes associated with an original software object. In some implementations of the system, the processor(s) may be configured to execute, using a parallel runner object separate from the original software object, at least two of the plurality of classes in parallel. In some implementations of the system, the original software object was written to be executed serially.

In some implementations of the system, the processor(s) may be configured to run the plurality of serially executable software object tasks in parallel such that the underlying software code is unmodified.

In some implementations of the system, the processor(s) may be configured to dynamically modify a number of available threads associated with executing the plurality of serially executable software object tasks based on available resources.

In some implementations of the system, the processor(s) may be configured to dynamically modify a number of available threads associated with executing the plurality of serially executable software object tasks based on detected workload.

In some implementations of the system, the steps may be integrated within an existing project or run standalone on a shell.

In some implementations of the system, the processor(s) may be configured to distribute the plurality of serially executable software object tasks for parallel execution on a plurality of separate machines or processing units with separate resources.

In some implementations of the system, the plurality of available machines may be selected from the group consisting of hosts, virtual machines and containers.

In some implementations of the system, the tasks may be distributed for parallel execution to a plurality of different types of available machines.

In some implementations of the system, the processor(s) may be configured to distribute the plurality of serially executable software object tasks for parallel execution based on system configuration data.

In some implementations of the system, the system configuration data may include one or more of thread dependencies, a list of available machines, and configuration data.

In some implementations of the system, distributing the plurality of serially executable software objects and storing the shared thread data may be performed by the same machine.

Another aspect of the present disclosure relates to a method for executing data processing tasks. The method may include receiving a plurality of serially executable software object tasks. The method may include obtaining thread data associated with a plurality of available threads and machine data associated with a plurality of available machines. The method may include distributing the plurality of serially executable software object tasks for parallel execution via the plurality of available threads and on the plurality of available machines. The method may include obtaining and storing shared thread data for the plurality of available threads such that first thread status data associated with a first thread from the plurality of available threads is made available to a second thread from the plurality of available threads.

In some implementations of the method, the plurality of serially executable software tasks may include a plurality of classes associated with an original software object. In some implementations of the method, it may include executing, using a parallel runner object separate from the original software object, at least two of the plurality of classes in parallel. In some implementations of the method, the original software object was written to be executed serially.

In some implementations of the method, it may include running the plurality of serially executable software object tasks in parallel such that the underlying software code is unmodified.

In some implementations of the method, it may include dynamically modifying a number of available threads associated with executing the plurality of serially executable software object tasks based on detected workload.

In some implementations of the method, it may include dynamically modifying a number of available threads associated with executing the plurality of serially executable software object tasks based on available resources.

In some implementations of the method, the steps may be integrated within an existing project or run standalone on a shell.

In some implementations of the method, it may include further including distributing the plurality of serially executable software object tasks for parallel execution on a plurality of separate machines or processing units with separate resources.

In some implementations of the method, the plurality of available machines may be selected from the group consisting of hosts, virtual machines and containers.

In some implementations of the method, the tasks may be distributed for parallel execution to a plurality of different types of available machines.

In some implementations of the method, it may include further including distributing the plurality of serially executable software object tasks for parallel execution based on system configuration data.

In some implementations of the method, the system configuration data may include one or more of thread dependencies, a list of available machines, and configuration data.

In some implementations of the method, distributing the plurality of serially executable software objects and storing the shared thread data may be performed by the same machine.

Yet another aspect of the present disclosure relates to a non-transient computer-readable storage medium having instructions embodied thereon, the instructions being executable by one or more processors to perform a method for executing data processing tasks. The method may include receiving a plurality of serially executable software object tasks. The method may include obtaining thread data associated with a plurality of available threads and machine data associated with a plurality of available machines. The method may include distributing the plurality of serially executable software object tasks for parallel execution via the plurality of available threads and on the plurality of available machines. The method may include obtaining and storing shared thread data for the plurality of available threads such that first thread status data associated with a first thread from the plurality of available threads is made available to a second thread from the plurality of available threads.

In some implementations of the computer-readable storage medium, the plurality of serially executable software tasks may include a plurality of classes associated with an original software object. In some implementations of the computer-readable storage medium, the method may include executing, using a parallel runner object separate from the original software object, at least two of the plurality of classes in parallel. In some implementations of the computer-readable storage medium, the original software object was written to be executed serially.

In some implementations of the computer-readable storage medium, the method may include running the plurality of serially executable software object tasks in parallel such that the underlying software code is unmodified.

In some implementations of the computer-readable storage medium, the method may include dynamically modifying a number of available threads associated with executing the plurality of serially executable software object tasks based on detected workload.

In some implementations of the computer-readable storage medium, the method may include dynamically modifying a number of available threads associated with executing the plurality of serially executable software object tasks based on available resources In some implementations of the computer-readable storage medium, the steps may be integrated within an existing project or run standalone on a shell.

In some implementations of the computer-readable storage medium, the method may include further including distributing the plurality of serially executable software object tasks for parallel execution on a plurality of separate machines or processing units with separate resources.

In some implementations of the computer-readable storage medium, the plurality of available machines may be selected from the group consisting of hosts, virtual machines and containers.

In some implementations of the computer-readable storage medium, the tasks may be distributed for parallel execution to a plurality of different types of available machines.

In some implementations of the computer-readable storage medium, the method may include further including distributing the plurality of serially executable software object tasks for parallel execution based on system configuration data.

In some implementations of the computer-readable storage medium, the system configuration data may include one or more of thread dependencies, a list of available machines, and configuration data.

In some implementations of the computer-readable storage medium, distributing the plurality of serially executable software objects and storing the shared thread data may be performed by the same machine.

Still another aspect of the present disclosure relates to a system configured for executing data processing tasks. The system may include means for receiving a plurality of serially executable software object tasks. The system may include means for obtaining thread data associated with a plurality of available threads and machine data associated with a plurality of available machines. The system may include means for distributing the plurality of serially executable software object tasks for parallel execution via the plurality of available threads and on the plurality of available machines. The system may include means for obtaining and storing shared thread data for the plurality of available threads such that first thread status data associated with a first thread from the plurality of available threads is made available to a second thread from the plurality of available threads.

In some implementations of the system, the plurality of serially executable software tasks may include a plurality of classes associated with an original software object. In some implementations of the system, the system may include means for executing, using a parallel runner object separate from the original software object, at least two of the plurality of classes in parallel. In some implementations of the system, the original software object was written to be executed serially.

In some implementations of the system, the system may include means for running the plurality of serially executable software object tasks in parallel such that the underlying software code is unmodified.

In some implementations of the system, the system may include means for dynamically modifying a number of available threads associated with executing the plurality of serially executable software object tasks based on detected workload.

In some implementations of the system, the system may include means for dynamically modifying a number of available threads associated with executing the plurality of serially executable software object tasks based on available resources.

In some implementations of the system, the steps may be integrated within an existing project or run standalone on a shell.

In some implementations of the system, the system may include means for further including distributing the plurality of serially executable software object tasks for parallel execution on a plurality of separate machines or processing units with separate resources.

In some implementations of the system, the plurality of available machines may be selected from the group consisting of hosts, virtual machines and containers.

In some implementations of the system, the tasks may be distributed for parallel execution to a plurality of different types of available machines.

In some implementations of the system, the system may include means for further including distributing the plurality of serially executable software object tasks for parallel execution based on system configuration data.

In some implementations of the system, the system configuration data may include one or more of thread dependencies, a list of available machines, and configuration data.

In some implementations of the system, distributing the plurality of serially executable software objects and storing the shared thread data may be performed by the same machine.

Even another aspect of the present disclosure relates to a computing platform configured for executing data processing tasks. The computing platform may include a non-transient computer-readable storage medium having executable instructions embodied thereon. The computing platform may include one or more hardware processors configured to execute the instructions. The processor(s) may execute the instructions to receive a plurality of serially executable software object tasks. The processor(s) may execute the instructions to obtain thread data associated with a plurality of available threads and machine data associated with a plurality of available machines. The processor(s) may execute the instructions to distribute the plurality of serially executable software object tasks for parallel execution via the plurality of available threads and on the plurality of available machines. The processor(s) may execute the instructions to obtain and store shared thread data for the plurality of available threads such that first thread status data associated with a first thread from the plurality of available threads is made available to a second thread from the plurality of available threads.

In some implementations of the computing platform, the plurality of serially executable software tasks may include a plurality of classes associated with an original software object. In some implementations of the computing platform, the processor(s) may execute the instructions to execute, using a parallel runner object separate from the original software object, at least two of the plurality of classes in parallel. In some implementations of the computing platform, the original software object was written to be executed serially.

In some implementations of the computing platform, the processor(s) may execute the instructions to run the plurality of serially executable software object tasks in parallel such that the underlying software code is unmodified.

In some implementations of the computing platform, the processor(s) may execute the instructions to dynamically modify a number of available threads associated with executing the plurality of serially executable software object tasks based on detected workload.

In some implementations of the computing platform, the processor(s) may execute the instructions to dynamically modify a number of available threads associated with executing the plurality of serially executable software object tasks based on available resources.

In some implementations of the computing platform, the steps may be integrated within an existing project or run standalone on a shell.

In some implementations of the computing platform, the processor(s) may execute the instructions to distribute the plurality of serially executable software object tasks for parallel execution on a plurality of separate machines or processing units with separate resources.

In some implementations of the computing platform, the plurality of available machines may be selected from the group consisting of hosts, virtual machines and containers. In some implementations of the computing platform, the tasks may be distributed for parallel execution to a plurality of different types of available machines.

In some implementations of the computing platform, the processor(s) may execute the instructions to distribute the plurality of serially executable software object tasks for parallel execution based on system configuration data.

In some implementations of the computing platform, the system configuration data may include one or more of thread dependencies, a list of available machines, and configuration data.

In some implementations of the computing platform, distributing the plurality of serially executable software objects and storing the shared thread data may be performed by the same machine.

What is claimed is:

1. An apparatus configured for processing instructions associated with one or more data processing tasks, the apparatus comprising:
   a non-transient computer-readable storage medium having executable instructions embodied thereon; and
   one or more hardware processors configured to execute the instructions to:
      receive a plurality of serially executable software object tasks, wherein the plurality of serially executable software object tasks comprise a plurality of classes associated with an original software object;

obtain thread data associated with a plurality of available threads and machine data associated with a plurality of available machines, wherein the plurality of available machines is selected from the group consisting of hosts, virtual machines and containers;

distribute the plurality of serially executable software object tasks for parallel execution via the plurality of available threads and on the plurality of available machines;

obtain and store shared thread data for the plurality of available threads such that first thread status data associated with a first thread from the plurality of available threads is made available to a second thread from the plurality of available threads; and execute, using a parallel runner object separate from the original software object, at least two of the plurality of classes in parallel without modifying the original software object, wherein the original software object was written to be executed serially.

2. The apparatus of claim 1 wherein the one or more hardware processors are further configured to execute the instructions to:

dynamically modify a number of available threads associated with executing the plurality of serially executable software object tasks based on detected workload or available resources.

3. The apparatus of claim 1 wherein the one or more hardware processors are further configured to execute the instructions to:

distribute the plurality of serially executable software object tasks for parallel execution on a plurality of separate machines or processing units with separate resources.

4. The apparatus of claim 1 wherein the one or more hardware processors are further configured to execute the instructions to:

distribute the plurality of serially executable software object tasks for parallel execution based on system configuration data.

5. The apparatus of claim 1 wherein the one or more hardware processors are further configured to execute the instructions to:

distribute the plurality of serially executable software object tasks for parallel execution to a plurality of different types of available machines.

6. The apparatus of claim 1 wherein distributing the plurality of serially executable software objects and storing the shared thread data are performed by the same machine.

7. A computer-implemented method for executing data processing tasks, the method comprising:

receiving a plurality of serially executable software object tasks, wherein the plurality of serially executable software object tasks comprise a plurality of classes associated with an original software object;

obtaining thread data associated with a plurality of available threads and machine data associated with a plurality of available machines, wherein the plurality of available machines is selected from the group consisting of hosts, virtual machines and containers;

distributing the plurality of serially executable software object tasks for parallel execution via the plurality of available threads and on the plurality of available machines;

obtaining and storing shared thread data for the plurality of available threads such that first thread status data associated with a first thread from the plurality of available threads is made available to a second thread from the plurality of available threads; and executing, using a parallel runner object separate from the original software object, at least two of the plurality of classes in parallel without modifying the original software object, wherein the original software object was written to be executed serially.

8. The method of claim 7 further comprising:

dynamically modifying a number of available threads associated with executing the plurality of serially executable software object tasks based on detected workload or available resources.

9. The method of claim 7 further comprising:

distributing the plurality of serially executable software object tasks for parallel execution on a plurality of separate machines or processing units with separate resources.

10. The method of claim 7 further comprising:

distributing the plurality of serially executable software object tasks for parallel execution based on system configuration data.

11. The method of claim 7 further comprising:

distributing the plurality of serially executable software object tasks for parallel execution to a plurality of different types of available machines.

12. The method of claim 7 wherein distributing the plurality of serially executable software objects and storing the shared thread data are performed by the same machine.

13. A non-transient computer-readable storage medium having instructions embodied thereon, the instructions being executable by one or more processors to perform a method for executing data processing tasks, the method comprising:

receiving a plurality of serially executable software object tasks, wherein the plurality of serially executable software object tasks comprise a plurality of classes associated with an original software object;

obtaining thread data associated with a plurality of available threads and machine data associated with a plurality of available machines, wherein the plurality of available machines is selected from the group consisting of hosts, virtual machines and containers;

distributing the plurality of serially executable software object tasks for parallel execution via the plurality of available threads and on the plurality of available machines;

obtaining and storing shared thread data for the plurality of available threads such that first thread status data associated with a first thread from the plurality of available threads is made available to a second thread from the plurality of available threads; and executing, using a parallel runner object separate from the original software object, at least two of the plurality of classes in parallel without modifying the original software object, wherein the original software object was written to be executed serially.

* * * * *